(12) United States Patent
Merchant et al.

(10) Patent No.: US 8,683,477 B2
(45) Date of Patent: Mar. 25, 2014

(54) PERFORMANCE DEGRADATION BASED AT LEAST ON COMPUTING APPLICATION PRIORITY AND IN A RELATIVE MANNER THAT IS KNOWN AND PREDICTABLE BEFOREHAND

(75) Inventors: Arif A. Merchant, Los Altos, CA (US); Mustafa Uysal, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 12/497,676

(22) Filed: Jul. 5, 2009

(65) Prior Publication Data
US 2011/0004884 A1  Jan. 6, 2011

(51) Int. Cl.
*G06F 9/46* (2006.01)
(52) U.S. Cl.
USPC .......................................................... 718/104
(58) Field of Classification Search
USPC .......................................................... 718/104
See application file for complete search history.

(56) References Cited

U.S. PATENT DOCUMENTS

| | | | | |
|---|---|---|---|---|
| 7,110,924 | B2 * | 9/2006 | Prewett et al. | 703/2 |
| 7,280,561 | B2 * | 10/2007 | Sahinoglu | 370/468 |
| 2006/0184838 | A1 * | 8/2006 | Singonahalli et al. | 714/45 |
| 2006/0212594 | A1 * | 9/2006 | Haner et al. | 709/232 |
| 2006/0280119 | A1 * | 12/2006 | Karamanolis et al. | 370/229 |

OTHER PUBLICATIONS

Dovrolis et al., "A Case for Relative Differentiated Services and the Proportional Differentiation Model", IEEE Network, Sep./Oct. 1999.*

Padala et al. "Adaptive Control of Virtualized Resources in Utility Computing Environments", EuroSys '07 Proceedings of the 2nd ACM SIGOPS/EuroSys European Conference on Computer Systems 2007, Mar. 21-23, 2007, pp. 289-302.*

[SFQ(D)] W. Jin, J. S. Chase, and J. Kaur. Interposed proportional sharing for a storage service utility. In SIGMETRICS '04/Performance '04: Proceedings of the joint international conference on Measurement and modeling of computer systems, pp. 37-48, Jun. 2004.

[Avatar] J. Zhang, A. Sivasubramaniam, Q. Wang, A. Riska, and E. Riedel. Storage performance virtualization via throughput and latency control. In Proc. of MASCOTS 2005, pp. 135-142, Sep. 2005.

[Cello] P. J. Shenoy and H. M. Vin. Cello: a disk scheduling framework for next generation operating systems. In Proc. of ACM SIGMETRICS, pp. 44-55, Jun. 1998.

[pClock] A. Gulati, A. Merchant, and P. Varman. pClock: An arrival curve based approach for QoS in shared storage systems. In Proceedings of the ACM Sigmetrics, pp. 13-24, Jun. 2007.

(Continued)

*Primary Examiner* — Jennifer To
*Assistant Examiner* — Brian Chew

(57) ABSTRACT

A model is constructed to determine performance of each computing application based on allocation of resources (including at least one hardware resource) to the computing applications. How the allocation of the resources to the computing applications affects the performance is unknown beforehand. The resources are allocated to the computing applications based at least on the model. Where the resources are overloaded as allocated to the computing applications, performance degradation of each computing application is performed based at least on priorities of the computing applications relative to one another and on the model. Performance degradation reduces usage of the resources by the computing applications so that the resources are no longer overloaded. How the priorities of the computing applications affect the performance degradation in a relative manner to one another is known and predictable beforehand.

13 Claims, 4 Drawing Sheets

(56) References Cited

OTHER PUBLICATIONS

[EfficientAllocation] Gulati, A., Merchant, A., Uysal, M., and Varman, P. Efficient and adaptive proportional share I/O scheduling. Tech. Rep. HPL-2007-186, HP Labs, Nov. 2007.

[Zygaria] T. M. Wong, R. A. Golding, C. Lin, and R. A. Becker-Szendy. Zygaria: Storage performance as managed resource. In Proc. of RTAS, pp. 125-134, Apr. 2006.

[AQuA] J. C. Wu and S. A. Brandt. The design and implementation of AQuA: an adaptive quality of service aware object-based storage device. In Proc. of IEEE/NASA Goddard Conference, 2006.

[Triage] M. Karlsson, C. Karamanolis, and X. Zhu. Triage: Performance differentiation for storage systems using adaptive control. Trans. Storage, 1(4):457-480, 2005.

[Argon] M. Wachs, M. Abd-El-Malek, E. Thereska, and G. R. Ganger. Argon: performance insulation for shared storage servers. In Proc. of Conf. on File and Storage Technologies (FAST'07), pp. 5-5, 2007.

[Sleds] D. D. Chambliss, G. A. Alvarez, P. Pandey, D. Jadav, J. Xu, R. Menon, and T. P. Lee. Performance virtualization for large-scale storage systems. In Symposium on Reliable Distributed System, pp. 109-118, Oct. 2003.

[Façade] C. Lumb, A. Merchant, and G. Alvarez. Façade: Virtual storage devices with performance guarantees. Proc of Conf. on File and Storage technologies (FAST'03), pp. 131-144, Mar. 2003.

[[AutoControl]] Pradeep Padala, Xiaoyun Zhu, Mustafa Uysal et al. Automated Control of Multiple Resources. In the proceedings of the *EuroSys 2009* [PDF].

\* cited by examiner

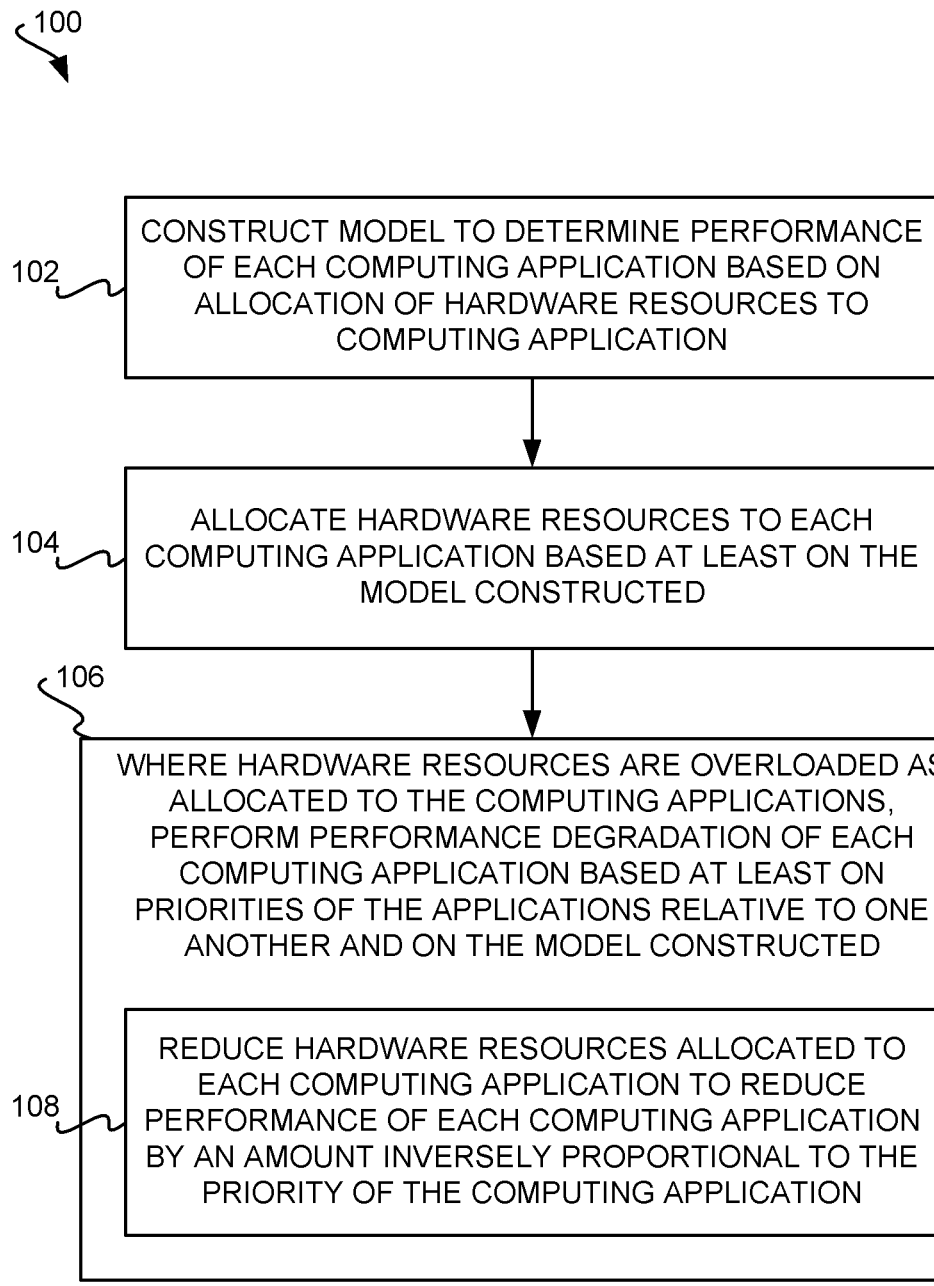

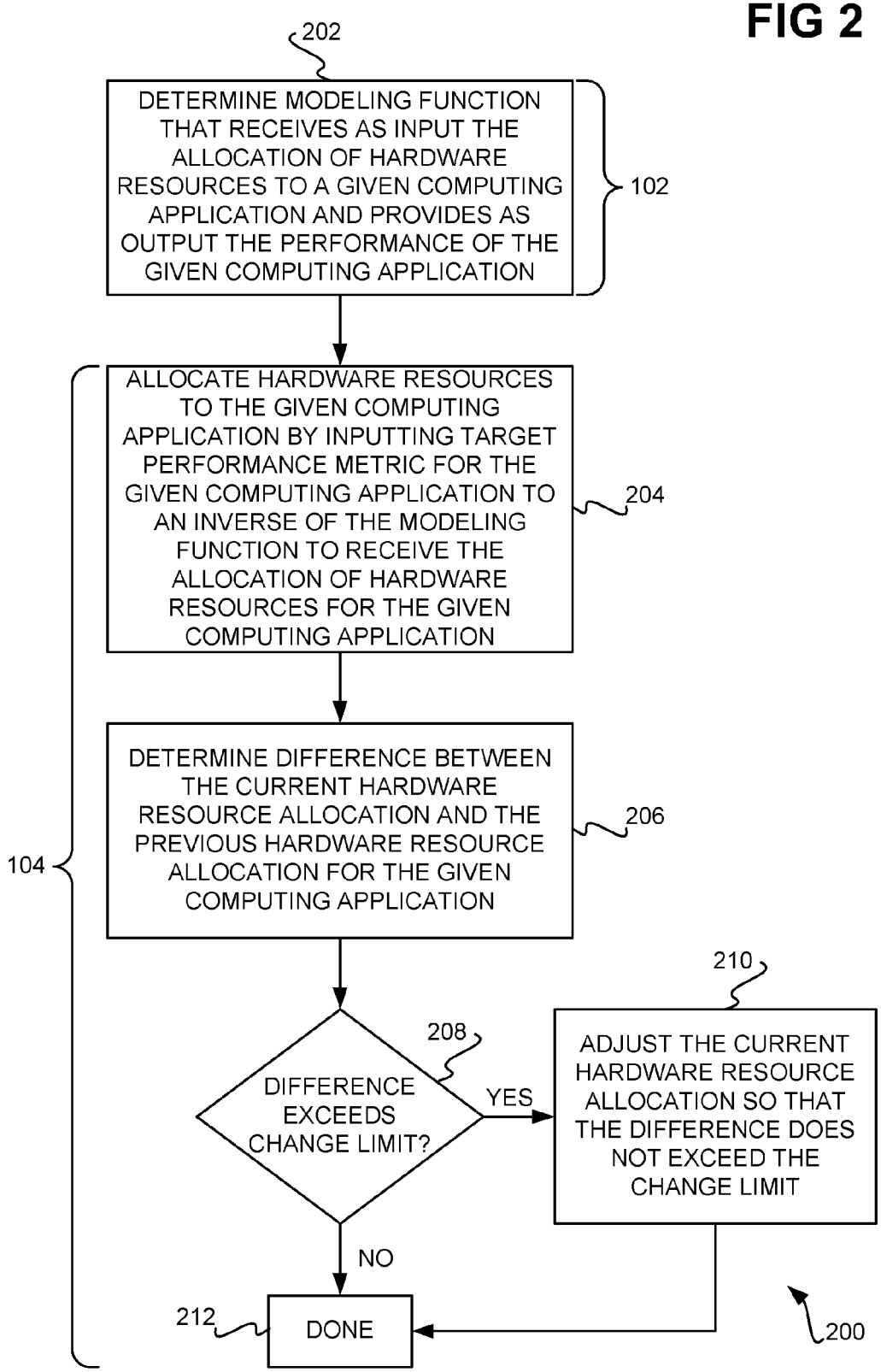

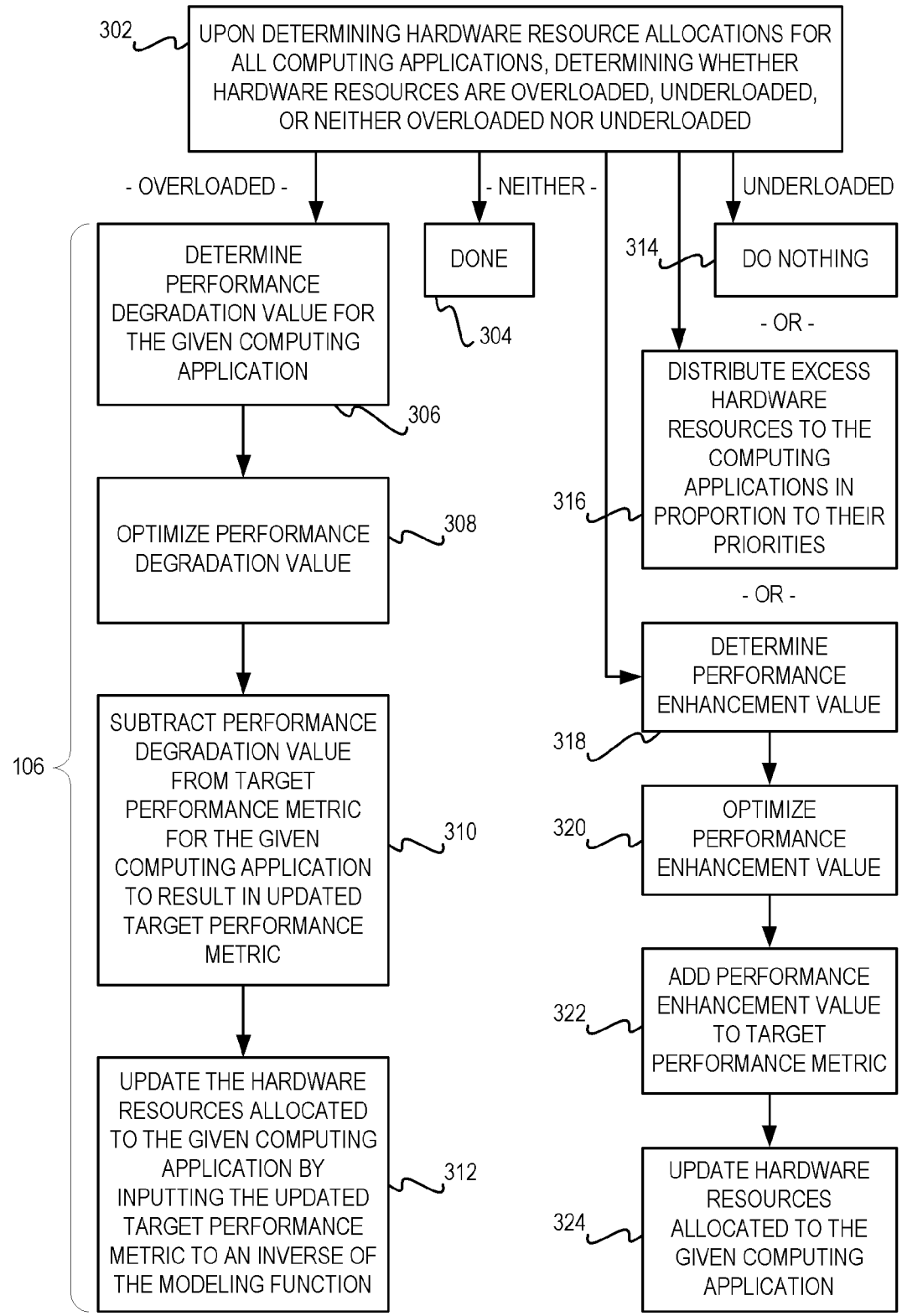

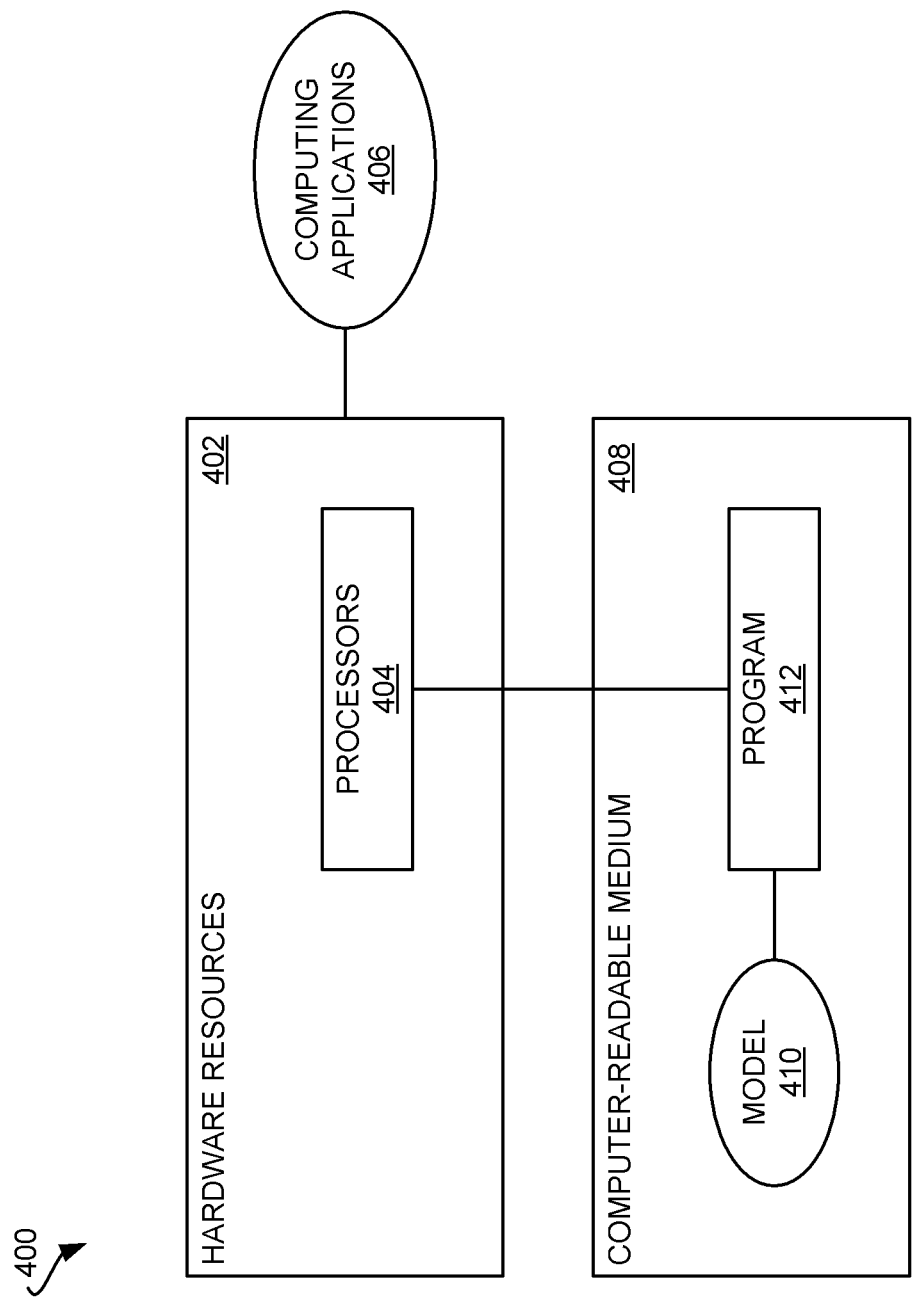

ical resources. However, other embodiments of the disclosure more generally pertain to any type of resources, and not just to hardware resources. For example, such resources may include software resources, bandwidth (which may or may not be considered a

PERFORMANCE DEGRADATION BASED AT LEAST ON COMPUTING APPLICATION PRIORITY AND IN A RELATIVE MANNER THAT IS KNOWN AND PREDICTABLE BEFOREHAND

BACKGROUND

A common type of computing scenario is one in which a number of computing applications are executed sharing the same hardware resources. As such, the hardware resources have to be allocated to the computing applications. Desirably, the computing applications are allocated hardware resources in a way to ensure that their target performance metrics can be satisfied. If the hardware resources become overloaded due to their allocation to the computing applications, however, then the usage of the hardware resources by the computing applications should be reduced.

BRIEF DESCRIPTION OF THE DRAWINGS

FIG. 1 is a flowchart of a method, according to an embodiment of the present disclosure.

FIG. 2 is a flowchart of a method to construct a model to determine performance of a computing application based on allocation of hardware resources to the application, and to allocated hardware resources to the application using the model, according to an embodiment of the present disclosure.

FIG. 3 is a flowchart of a method for decreasing performance of a computing application where hardware resources overload has occurred, and for allocating additional resources to the computing application where hardware resources underload has occurred, according to an embodiment of the present disclosure.

FIG. 4 is a diagram of a system, according to an embodiment of the present disclosure.

DETAILED DESCRIPTION

As noted in the background section, computing applications that share hardware resources for their execution are desirably allocated the hardware resources in such a way to ensure that their target performance metrics can be satisfied. A target performance metric can be defined as the performance that a computing application desirably has when executing. The target performance metrics for different computing applications can be defined in different ways. For example, one computing application may have its target performance metric specified as a number of processing requests performed per second, whereas another application may have its target metric specified as a number of clients the application is able to serve.

The computing applications generally have different priorities, so that higher priority applications are allocated more hardware resources than lower priority applications with respect to ensuring that their target performance metrics can be satisfied. However, if the hardware resources become overloaded due to the manner by which the computing applications are allocated the hardware resources, then the usage of the hardware resources should be reduced. Stated another way, the performance of each computing application is degraded.

How the allocation of the hardware resources to the computing applications affects their performance is commonly a priori unknown (i.e., unknown beforehand) and unpredictable. That is, without first allocating the hardware resources to the computing applications and monitoring the performance of the applications, it cannot otherwise be determined and thus is unknown how hardware resource allocation affects the performance of the applications. The relationship between hardware resource allocation and computing application performance is thus a priori unknown in that it is not known beforehand how allocation affects performance. The relationship between allocation and performance is unpredictable in that beforehand there is no model or function, for instance, which can be used to predict how hardware resource allocation affects application performance.

In these types of situations, when computing application performance has to be degraded as a result of hardware resources overload occurring, how the priorities of the computing applications affect their performance degradation relative to one another is also typically a priori unknown (i.e., unknown beforehand) and unpredictable. While higher priority applications may have their performance degraded less than lower priority applications so that an overload situation no longer occurs, exactly how much the performance of the applications will be degraded is not known, and is unpredictable in that there is no model or function, for instance, that specifies how application performance is degraded. This situation is particularly problematic, as users do not have the ability to specify the priorities of the applications with a specific understanding as to how such priorities will affect performance degradation to cure resource overload.

It is noted in this respect that the hardware resource allocation needed to satisfy performance targets of the computing applications can vary over time. In some situations, these changes can be quite rapid and occur unpredictably, due to the computing applications' workloads changing. This makes it difficult for a user to allocate hardware resources to the computing applications, since such allocations are generally unable to be static, and instead have to be dynamic.

Embodiments of the present disclosure overcome these difficulties. In particular, in the common situation in which how the allocation of hardware resources to computing applications affects application performance is a priori unknown and unpredictable, embodiments nevertheless permit how priorities of the applications affect performance degradation in a relative manner to one another to be a priori known and predictable. As such, users can more confidently set the priorities of the computing applications, with the knowledge that how these priorities will affect application performance is a priori understood. Stated another way, the users can set computing application priorities in such a way as to force subsequent performance degradation to occur in a particular and graceful way, instead of being unknown and unpredictable.

FIG. 1 shows a method 100, according to such an embodiment of the disclosure. Like other methods of embodiments of the disclosure, the method 100 can be implemented as a computer program stored on a computer-readable medium. The computer-readable medium may be a non-volatile medium, such as a non-volatile magnetic medium like a hard disk drive or a non-volatile semiconductor medium like a flash drive. The computer-readable medium may also or alternatively be a volatile medium, such as a volatile semiconductor medium like dynamic random access memory. The computer program is executed by a processor of a computing device to perform the method 100.

It is noted that the method 100 is described in relation to hardware resources, which can include resources such as processors, storage devices like hard disk drives, and so on. However, other embodiments of the disclosure more generally pertain to any type of resources, and not just to hardware resources. For example, such resources may include software resources, bandwidth (which may or may not be considered a hardware resource), and so on. As such, the description of hardware resources herein is exemplary of a representative embodiment, and other embodiments can use other types of resources, in addition to or in lieu of hardware resources.

A model is constructed to determine the performance of each computing application, based on the allocation of hardware resources to the computing application (102). For example, a history of prior allocations of hardware resources to a given computing application results in a history of prior performances of the given application being measured. The history of prior allocations and the history of prior performances can then be used to construct a model to determine the performance of the given computing application. In this way, even where how the allocation of the hardware resources to the computing applications affects the performances of the applications is a priori unknown and unpredictable, models can nevertheless be constructed based on past allocations and past performances corresponding to these past allocations. Part 102 is thus performed for each computing application.

The hardware resources are allocated to each computing application based at least on the model constructed (104). For example, the target performance metric of a given computing application may be input into the model for the given application. The output of the model in this case is the allocation of the hardware resources for the given computing application. Part 104 is performed for each computing application, to determine the hardware resources to allocate to each computing application.

Where the hardware resources are overloaded as a result of the allocations of the hardware resources to the computing applications (106), the performance of each computing application is degraded based at least on the priorities of the applications and on the models. The hardware resources may be considered to be in an overloaded state in one embodiment where the target performance metrics of all the computing applications cannot be jointly met using the hardware resources as allocated to the computing applications. In one embodiment, the hardware resources allocated to each computing application are reduced to reduce the performance of each computing application, by an amount inversely proportional to the priority of the computing application (108). In this and other embodiments, then, how the priorities of the computing applications affect their performance degradation-in a relative manner to one another-is a priori known and predictable. It is noted that in other embodiments, the hardware resources allocated to each computing application are reduced based on the model that has been constructed, in addition to the priorities of the computing applications, as will become apparent later in the detailed description.

FIG. 2 shows a method 200 that can be used to implement parts 102 and 104 of the method 100, as explicitly shown in FIG. 2, according to an embodiment of the disclosure. While the method 200 is described in relation to a particular exemplary computing application referred to herein as the given computing application, the method 200 is performed in relation to each computing application. A modeling function is determined that receives as input the allocation of hardware resources to a given computing application, and provides as output the performance of the given computing application (202).

The modeling function for a given computing application $A_i$ may thus be referred to as $y=f_i(u_i)$, where $u_i$ is the resource allocation to the application $A_i$. The function $f_i$ is derived from two vectors $u_i$ and $y_i$. The vector $u_i$ is a vector of historical resource assignments to $A_i$, in the form $<u_{i0}, u_{i1}, \ldots, u_{in}>$, where $u_{ij}$ is the resource assignment to $A_i$ at time j, and there is a total of n past resource assignments to $A_i$. The vector $y_i$ is a vector of historical performance metrics of $A_i$ in correspondence with the historical resource assignments to $A_i$. The vector $y_i$ is in the form $<y_{i0}, y_{i1}, \ldots, y_{in}>$, where $y_{ij}$ is the measured performance metric of $A_i$ at time j, and there is a total of n past such measured performance metrics of $A_i$.

The function $f_i$ can be derived in a number of different ways from the two vectors. For example, a regression approach may be utilized to derive the function $f_i$ from the two vectors. Examples of regression approaches that can be used include linear regression, as well as the recursive least squares regression approach.

Once the modeling function for the given computing application has been determined, hardware resources are allocated to the given application by inputting the target performance metric for the given application to an inverse of this function (204). The result is the (current) allocation of the hardware resources for the given computing application. For example, because $y_i=f_i(u_i)$, this means that $u_i=f_i^{-1}(y_i)$. Therefore, where $y_i$ is input as the target performance metric for the given application, the hardware resource allocation u to the given computing application $A_i$ is determined.

The given computing application $A_i$ may, however, have an allocation change limit $I_i$. The allocation change limit specifies that the current allocation of hardware resources to the given computing application as compared to a prior allocation of hardware resources to the given application cannot exceed the limit $I_i$. That is, $|u_{ij}-u_{ij-1}|<I_i$, where the current allocation $u_{ij}$ for the given computing application is specifically compared to the immediately previous allocation $u_{ij-1}$ for the given application.

Therefore, the method 200 determines the difference between the current hardware resource allocation and the previous hardware resource allocation for the given computing application (206). That is, the difference $d_i=u_{ij}-u_{ij-1}$ is determined. If this difference exceeds the allocation change limit for the given computing application (208), then the current hardware resource allocation is adjusted so that the difference does not exceed the change limit (210). That is, if the difference $d_i$ is greater than the allocation change limit $I_i$ for the given computing application $A_i$, then the current hardware resource allocation $u_{ij}$ is set to $u_{ij-1}+I_i$, and if $d_i$ is less than $-I_i$, then the current hardware resource allocation $u_{ij}$ is set to $u_{ij-1}-I_i$. By comparison, if the difference does not exceed the allocation change limit (208), then the method 200 is finished (212).

FIG. 3 shows a method 300 that can be used to implement part 106 of the method 100, as explicitly shown in FIG. 3, according to an embodiment of the disclosure. While the method 300 is described in relation to a particular exemplary computing application referred to herein again as the given computing application, the method 300 is performed in relation to each computing application. The method determines whether the allocations of the hardware resources to all the computing applications has resulted in an overloaded state of the hardware resources, an underloaded state of the hardware resources, or neither an overloaded state nor an unloaded state (302).

Where the allocations of the hardware resources to all the computing applications has resulted in an overloaded state of the hardware resources, parts 306, 308, 310, and 312 are performed. As noted above, the hardware resources may be considered to be in an overloaded state where there are insufficient hardware resources to satisfy the target performance metric of each computing application. In such instance, the usage of the hardware resources by the computing applications is reduced so that the hardware resources are no longer in an overloaded state.

A performance degradation value for the given computing application is determined (306). The performance degradation value is determined as equal to the priority $p_i$ of the given computing application $A_i$, multiplied by the difference of the output of the modeling function for the given application and the value of one, where the modeling function has been normalized to a target performance metric having a value of one. For example, at time j, the performance degradation value is $pdv_i = p_i(f_i(u_{ij})-1)$. Thus, to determine the performance degradation value, the performance metric of the given computing application $A_i$ is obtained by inputting the current hardware resource allocation $u_{ij}$ to the modeling function, subtracting one from the resulting output of the modeling function, and multiplying this difference times the priority $p_i$.

The higher the priority $p_i$ of the given computing application $A_i$ is, the higher the priority of the given application $A_i$ in comparison to the other computing applications. Likewise, the lower the priority $p_i$ of the given computing application $A_i$ is, the lower the priority of the given application $A_i$ in comparison to the other computing applications. For example, if there are four computing applications that have the priorities 1, 2, 2, 4, the application having the priority of 2 has twice as high a priority as the applications that have the priority of 1, since 2/1=2, and the application having the priority of 4 has four times as high a priority as the application that has the priority of 1, since 4/1=4. Likewise, the computing application having the priority of 4 has a priority that is twice as high as the application having the priority of 2, since 4/2=2.

Because the performance degradation value is explicitly based on the priority of the given computing application relative to the other computing applications, it is a priori known and predictable how the priority of the given application affects the performance degradation of the given application relative to the performance degradations of the other applications. For example, if there are four computing applications that have the priorities 1, 2, 2, and 4, and if the performance degradation of the application having the priority of 4 is 10%, then it is a priori known and predictable that the performance degradations of the applications having the priorities of 2 will be 20%. Similarly, it is a priori known and predictable that the performance degradation of the computing application having the priority of 1 will be 40%. As such, the performance degradation suffered by each computing application is inversely proportional to its priority in this embodiment.

The performance degradation value that is determined for the given computing application may be optimized (308). For example, a linear programming problem may be solved to optimize the performance degradation value, a quadric programming problem may be solved to optimize the performance degradation value, or another type of optimization approach may be performed to optimize the performance degradation value. The purpose of optimizing the performance degradation value is to equalize the performance degradation value as much as possible within the hardware resources change limit for the given computing application, given the total amount of hardware resources available. In at least some embodiments, the resources not allocated to any application are also minimized (that is, as many resources as possible are attempted to be allocated to the applications), in accordance with the change limits of the computing applications, to attempt to minimize performance degradation as much as possible.

The performance degradation value, as may have been optimized, is then subtracted from the target performance metric for the given computing application to result in an updated target performance metric (310). For example, where the performance degradation value is $pdv_i$ for the given computing application $A_i$, it is subtracted from the target performance metric $y_i$ for the given application $A_i$, to result in the difference $y_i - pdv_i$. The hardware resource allocation for the given computing application $A_i$ is then updated by inputting this updated target performance metric to an inverse of the modeling function that has been determined (312). That is, $u_{ij}$ is updated as $f_i^{-1}(y_i - pdv_i)$.

Where the allocations of the hardware resources to all the computing applications has not resulted in either an overloaded state or an underloaded state of the hardware resources, however, part 304 is performed. That is, the method 300 is finished (304). The hardware resources being allocated to all the computing application such that the resources are neither overloaded or underloaded means that all the hardware resources are being used as efficiently and as completely as possible. In this perfect situation, then, the method 300 does not have to adjust the hardware resource allocations to the computing applications as has been previously determined. All of the computing applications are satisfying their target performance metrics, and none of the hardware resources are underloaded or overloaded.

However, where the allocations of the hardware resources to all the computing applications has resulted in an underloaded state of the hardware resources, part 314, part 316, or parts 318, 320, 322, and 324 can be performed. The hardware resources may be considered to be in an underloaded state where the target performance metric of each computing application is being satisfied, but there are nevertheless excess hardware resources that are not being utilized by (i.e., that have not been allocated to) the computing applications. In one embodiment, the method 300 does nothing in this situation (314). In another embodiment, the method 300 distributes the excess hardware resources to the computing applications in proportion to their priorities (316). For example, excess hardware resources hw may be distributed to the given computing application $A_i$ such that the extra hardware resources allocated to the given application $A_i$ is $hw_i = hw(p_i/P)$, where P is the sum of the priorities of all the computing applications.

In a third embodiment, the following is performed. A performance enhancement value for the given computing application is determined (318). The performance enhancement value is determined as equal to the difference between the output of the modeling function for the given computing application $A_i$ and the value of one, divided by the priority $p_i$ of the given application $A_i$, where the modeling function has been normalized to a target performance metric having a value of one. For example, at time j, the performance enhancement value is $pev_i = (f_i(u_{ij})-1)/p_i$. Thus, to determine the performance enhancement value, the performance metric of the given computing application $A_i$ is obtained by inputting the current hardware resource allocation $u_{ij}$ to the modeling function, subtracting one from the resulting output of the modeling function, and dividing this differences times the priority $p_i$.

The performance enhancement value that is determined for the given computing application may be optimized (320). The performance enhancement value may be optimized in the same manner in which the performance degradation value is optimized in part 308, as described above. The purpose of optimizing the performance enhancement value is to equalize the performance enhancement value as much as possible within the hardware resources change limit for the given computing application.

The performance enhancement value, as may have been optimized, is then added to the target performance metric for the given computing application to result in an updated target performance metric (322). For example, where the performance enhancement value is $pev_i$ for the given computing application $A_i$, it is added to the target performance metric $y_i$ for the given application $A_i$, to result in the sum $y_i+pev_i$. The hardware resource allocation for the given computing application $A_i$ is then updated by inputting this updated target performance metric to an inverse of the modeling function that has been determined (324). That is, $u_{ij}$ is updated as $f_i^{-1}(y_i+pev_i)$.

As noted above, the computing applications may have different types of target performance metrics. The target performance metrics of the computing application are thus said to be heterogeneous, where at least two of the computing applications use different types of measurements for their target performance metrics. It is noted that embodiments of the present disclosure are amenable to implementation when heterogeneous target performance metrics are employed. To permit this, in one embodiment, the performance metrics are normalized when determining the models or modeling functions for the computing applications, and are normalized when using these models or modeling functions.

In conclusion, FIG. 4 shows a representative computing system 400, according to an embodiment of the disclosure. The methods 100, 200, and 300 that have been described can be performed by and in relation to the computing system 400. The system 400 may be implemented over one or more computing devices in one embodiment. In the case where the system 400 is implemented via more than one computing device, the computing devices may be communicatively connected to one another over a network.

The computing system 400 includes a number of hardware resources, including one or more processors 404, as well as a number of computing applications 406, and a computer-readable medium 408 that stores a model 410 and a computer program 412. The hardware resources 402 can include, in addition to the processors 404, non-volatile and/or volatile storage devices, such as hard disk drives, flash drives, volatile semiconductor memory, and so on, as well as other types of hardware resources 402. The hardware resources 402 are allocated to the computing applications 406 so that the applications can be executed. As noted above, the computing applications 406 each have a priority.

The computer-readable medium 408 may be one of the hardware resources 402 in one embodiment. The computer-readable medium 408 may be a non-volatile medium or a volatile medium, as has been described. The model 410 that is stored on the computer-readable medium 408 is that which is constructed in the methods 100 and 200. Thus, the model 410 determines the performance of each computing application 406 based on the allocation of the hardware resources 402 to the computing applications 406.

The computer program 412 is executed by the processors 404 from the computer-readable medium 408. As such, the processors 404 may be part of the hardware resources 402 allocated to the computing applications 406, as is explicitly shown in FIG. 4, or the processors 404 may be hardware resources that are apart from the resources 402 allocated to the applications 406. The computer program 412 performs the methods 100, 200, and 300 that have been described. For example, in relation to the method 100, the computer program 412 constructs the model 110 in part 102, allocates the hardware resources 402 to the computing applications 406 in part 104, and performs performance degradation of each computing application 406 in part 106.

We claim:

1. A method comprising:
constructing a respective model to determine respective performance of each computing application of a plurality of computing applications based on allocation of resources to the computing applications, where how the allocation of the resources to the computing applications affects the respective performances is unknown before the respective performances occur;
allocating, by a processor of a computing device, the resources to the computing applications based at least on the respective models constructed,
where the resources include at least one hardware resource; and, where the resources are overloaded as allocated to the computing applications, performing, by the processor of the computing device, performance degradation of each computing application based at least on priorities of the computing applications relative to one another and on the respective models constructed, to reduce usage of the resources by the computing applications so that the resources are no longer overloaded,
wherein how the priorities of the computing applications affect the performance degradation in a relative manner to one another is known and predictable with respect to how much the respective performances of the computing applications degrade, before the performance degradation occurs,
wherein constructing the respective model to determine the respective performance of each computing application comprises, for a given computing application, determining a modeling function receiving as input the allocation of the resources to the given computing application and providing as output the respective performance of the given computing application for the allocation of the resources.

2. The method of claim 1, wherein the modeling function is determined based on a history of resource allocations to the given computing application, and based on a history of performance metrics of the given computing application corresponding to the history of the resource allocations to the given computing application.

3. The method of claim 1, wherein allocating the resources to the computing applications based at least on the respective models constructed comprises, for the given computing application:
allocating the resources to the given computing application by inputting a target performance metric for the given computing application to an inverse of the modeling function, to generate a current resource allocation for the given computing application.

4. The method of claim 3, wherein each computing application has a target performance metric, such that the target performance metrics of the computing applications are heterogeneous in that at least two of the computing applications use different types of measurements for the target performance metrics.

5. The method of claim 1, wherein performing performance degradation of each computing application based at least on the priorities of the computing applications relative to one another and on the respective models constructed comprises, for the given computing application having a given priority:
determining a performance degradation value equal to the given priority of the given computing application multiplied by a difference of the output of the modeling function and a value of one, wherein an allocation of the resources to the given computing application is provided as the input to the modeling function, and the modeling function has been normalized to a target performance metric having a value of one.

6. The method of claim 5, wherein performing performance degradation of each computing application based at least on the priorities of the computing applications relative to one another and on the respective models constructed further comprises, for the given computing application: subtracting the performance degradation value from a target performance metric for the given computing application to result in an updated target performance metric for the given computing application; and, updating the resources allocated to the given computing application by inputting the updated target performance metric for the given computing application to an inverse of the modeling function.

7. The method of claim 5, wherein performing performance degradation of each computing application based at least on the priorities of the computing applications relative to one another and on the respective models constructed further comprises, for the given computing application:
optimizing the performance degradation value to equalize the performance degradation value as much as possible within a predetermined resource allocation change limit for the given computing application.

8. The method of claim 1, further comprising, where the resources allocated to the computing applications are underloaded, performing performance enhancement of each computing application based at least on the priorities of the computing applications relative to one another and on the respective models constructed by, for a given computing application:
determining a performance enhancement value equal to a difference of the output of the modeling function and a value of one, divided by the priority of the given computing application, where an allocation of the resources to the given computing application is provided as the input to the modeling function;
adding the performance enhancement value to a target performance metric for the given computing application to result in an updated target performance metric for the given computing application; and,
updating the resources allocated to the given computing application by inputting the updated target performance metric for the given computing application to an inverse of the modeling function.

9. The method of claim 1, wherein each computing application has a target performance metric, and the resources as allocated to the computing applications are overloaded in that the target performance metrics of all the computing applications cannot be jointly met using the resources as allocated to the computing applications.

10. The method of claim 1, wherein performing performance degradation of each computing application based at least on the priorities of the computing applications relative to one another and on the respective models constructed comprises, for a given computing application having a given priority:
reducing the resources allocated to the given computing application to reduce the respective performance of the given computing application by an amount inversely proportional to the given priority of the given computing application.

11. The method of claim 1, further comprising, where the resources allocated to the computing applications are underloaded, distributing excess resources to the computing applications in proportion to the priorities of the computing applications.

12. A non-transitory computer-readable medium having a computer program stored thereon for execution by a processor to perform a method comprising:
constructing a respective model to determine respective performance of each computing application of a plurality of computing applications based on allocation of resources to the computing applications, where how the allocation of the resources to the computing applications affects the respective performances is unknown before the respective performances occur;
allocating the resources to the computing applications based at least on the respective models constructed; and,
where the resources are overloaded as allocated to the computing applications, performing performance degradation of each computing application based at least on priorities of the computing applications relative to one another and on the respective models constructed, to reduce usage of the resources by the computing applications so that the resources are no longer overloaded,
wherein how the priorities of the computing applications affect the performance degradation in a relative manner to one another is known and predictable with respect to how much the respective performances of the computing applications degrade, before the performance degradation occurs,
wherein constructing the respective model to determine the respective performance of each computing application comprises, for a given computing application, determining a modeling function receiving as input the allocation of the resources to the given computing application and providing as output the respective performance of the given computing application for the allocation of the resources.

13. A system comprising:
a plurality of resources including a processor;
a plurality of computing applications executable by the processor, each computing application having a priority;
a computer-readable medium to store:
a respective model to determine respective performance of each computing application based on allocation of the resources to the computing application, where how the allocation of the resources to the computing applications affects the respective performances is unknown before the respective performances occurs; and,
a computer program executable by the processor, the computer program to allocate the resources to the computing applications based at least on the respective models, and where the resources are overloaded as allocated to the computing applications, to perform performance degradation of each computing application to reduce usage of the resources by the computing applications so that the resources are no longer overloaded,
wherein the performance degradation of each computing application is performed based at least on the priorities of the computing applications relative to one another and on the respective models,
wherein how the priorities of the computing applications affect the performance degradation in a relative manner to one another is known and predictable with respect to how much the respective performances of the computing applications degrade, before the performance degradation occurs, and
wherein the respective model to determine the respective performance of each computing application is constructed at least in part by, for a given computing application, determining a modeling function receiving as input the allocation of the resources to the given computing application and providing as output the respective performance of the given computing application for the allocation of the resources.

* * * * *